United States Patent
Imazawa et al.

(10) Patent No.: US 7,741,742 B2
(45) Date of Patent: Jun. 22, 2010

(54) ALTERNATOR

(75) Inventors: Yoshiro Imazawa, Chiyoda-ku (JP);
Hiroya Ikuta, Chiyoda-ku (JP);
Shinichi Ito, Chiyoda-ku (JP);
Yoshihiro Shinosaka, Chiyoda-ku (JP);
Shinji Nishimura, Chiyoda-ku (JP);
Toshiyuki Oonishi, Minato-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 48 days.

(21) Appl. No.: 12/259,839

(22) Filed: Oct. 28, 2008

(65) Prior Publication Data

US 2010/0007231 A1 Jan. 14, 2010

(30) Foreign Application Priority Data

Jul. 9, 2008 (JP) ............................. 2008-179251

(51) Int. Cl.
*H02K 11/00* (2006.01)
(52) U.S. Cl. ........................... 310/68 D; 310/91; 310/64
(58) Field of Classification Search .................. 310/64, 310/71, 68 D, 89, 91, 68 R
See application file for complete search history.

(56) References Cited

U.S. PATENT DOCUMENTS

| | | | | |
|---|---|---|---|---|
| 5,453,648 A | * | 9/1995 | Bradfield | 310/71 |
| 5,473,208 A | * | 12/1995 | Stihi | 310/68 D |
| 6,081,054 A | * | 6/2000 | Kashihara et al. | 310/68 D |
| 6,100,613 A | * | 8/2000 | Tanaka et al. | 310/68 D |
| 6,307,289 B1 | * | 10/2001 | Skala | 310/68 D |
| 6,696,914 B2 | * | 2/2004 | Haupt et al. | 337/295 |
| 6,787,952 B2 | * | 9/2004 | Asao | 310/68 D |
| 6,936,941 B2 | * | 8/2005 | Oohashi et al. | 310/68 D |
| 7,456,532 B2 | * | 11/2008 | Oohashi | 310/68 D |
| 7,605,502 B2 | * | 10/2009 | Kondo et al. | 310/68 D |
| 7,612,474 B2 | * | 11/2009 | DePetris et al. | 310/68 D |
| 2003/0102733 A1 | | 6/2003 | Asao | |
| 2004/0256927 A1 | | 12/2004 | Oohashi et al. | |

FOREIGN PATENT DOCUMENTS

DE      10 2006 047 171 A1    11/2007

(Continued)

OTHER PUBLICATIONS

German Official Action dated Nov. 2, 2009, corresponding to DE 10 2008 056 360.9-32.

*Primary Examiner*—Thanh Lam
(74) *Attorney, Agent, or Firm*—Sughrue Mion, PLLC

(57) ABSTRACT

A vehicular alternator is provided which can suppress the vibration of a circuit board. The vehicular alternator has a rectifier that includes a plurality of diodes forming a full-wave rectifier circuit, a pair of negative and positive terminal side heat sinks that hold the diodes, and a circuit board connecting the diodes and a stator coil to one another, wherein the negative and positive terminal side heat sinks and the circuit board are mounted on a casing at a plurality of mounting portions, which are superposed with one another in an axial direction of a shaft, by using mounting members. Between adjacent ones of the mounting portions, there are formed abutment portions in which the circuit board is superposed on and placed in abutment with the negative terminal side heat sink or the positive terminal side heat sink, and the abutment portions are fixed to each other by rivets.

8 Claims, 4 Drawing Sheets

FOREIGN PATENT DOCUMENTS

| | | |
|---|---|---|
| JP | 09-009593 A | 1/1997 |
| JP | 2006-191712 A | 7/2006 |
| JP | 3826775 B2 | 7/2006 |
| JP | 4020211 B2 | 10/2007 |
| JP | 2007-306730 A | 11/2007 |

* cited by examiner

ALTERNATOR

BACKGROUND OF THE INVENTION

1. Field of the Invention

The present invention relates to an alternator that is provided with a rectifier which is mounted, for example, on a vehicle for rectifying an alternating current generated in a stator coil of a stator into a direct current.

2. Description of the Related Art

In the past, in an alternator for a vehicle as described in a first patent document (Japanese patent 4020211, paragraphs 0010-0013 and FIG. 2 through FIG. 4), incorporated herein by reference, there is provided a rectifier 12 that is electrically connected to a stator coil 16 for rectifying an alternating current generated in the stator coil 16 into a direct current. The rectifier 12 includes a plurality of diodes 23, 25 that form a full-wave rectifier circuit, a negative terminal side heat sink 26 and a positive terminal side heat sink 24 that serve to hold these diodes 23, 25, respectively, and a circuit board 20 that serves to make electrical connections between the diodes 23, 25 and the stator coil 16, wherein the negative terminal side heat sink 26, the positive terminal side heat sink 24 and the circuit board 20 are mounted on a casing 3 at three mounting portions 20a, 20b, 20c, which are superposed with one another in an axial direction of a shaft 6, by the use of screws 40.

In this case, the circuit board 20 of the rectifier 12 is arranged in a bridge state between two points of the mounting portions 20a, 20b, 20c, and vibration suppression portions 20ab, 20ac, each having a thickness larger than that of each of the mounting portions 20a, 20b, 20c, are provided on the mounting portions 20a, 20b, 20c so as to reduce the easiness or frequency of occurrence of a vibration mode. As a result, the occurrence of the vibration mode of the circuit board 20 between the above-mentioned two points can be suppressed.

In addition, in a rectifier of a vehicular alternator as described in a second patent document (Japanese patent 3826775, paragraph 0022 and FIG. 5), incorporated herein by reference, a fastening metal fitting 58 with a female threaded portion 59 formed therein is inserted in a terminal block 50, and a through hole 44 is formed in a region of a positive terminal side cooling fin 42 at a location opposing the fastening metal fitting 58, wherein a fastening bolt 70 is caused to extend or penetrate into the through hole 44 in the positive terminal side cooling fin 42 to be placed into threaded engagement with the female threaded portion 59 of the fastening metal fitting 58, whereby the positive terminal side cooling fin 42 and the terminal block 50 are fixedly connected with each other.

As shown in FIG. 3 of the above-mentioned first patent document, in this rectifier 12, each of the first insulating members 41 is of a cylindrical shape and has a flange interposed between the negative terminal side heat sink 26 and the positive terminal side heat sink 24. The circuit board 20, the positive terminal side heat sink 24 and the negative terminal side heat sink 26 are formed or assembled into an integral unit by causing second insulating members 42, each of which takes a cylindrical shape and has a flange, to extend through holes in the first insulating members 41 and the positive terminal side heat sink 24 and holes in the mounting portions 20a, 20b, 20c.

Further, the rectifier 12 thus integrally assembled is fixedly secured to a rear bracket 2 by causing the screws 40 to penetrate or extend through the respective second insulating members 42 to be threaded with the rear bracket 2.

The flanges of the first insulating members 41 are sandwiched between the negative terminal side heat sink 26 and the positive terminal side heat sink 24 which are both made of aluminum and hence have thermal expansion coefficients different from that of the first insulating members 41. As a result, in case where the alternator is mounted on a vehicle and used under an environment in which the temperature of the alternator changes from −40 degrees C. to 120 degrees C, the mutual connection or coupling of the circuit board 20, the positive terminal side heat sink 24, and the negative terminal side heat sink 26 often becomes unstable.

Therefore, there has been a problem that vibration applied to the alternator when it is mounted on the vehicle might directly cause damage or breakage in the connecting portions of the diodes 23, 25 and the circuit board 20.

In addition, the vibration suppression portions 20ab, 20ac provided on the rectifier 12 are larger in thickness than the mounting portions 20a, 20b, 20c, so there has also been another problem that the weight of the circuit board 20 itself is increased, giving rise to a feat that the increased weight might be applied to the above-mentioned connecting portions.

Also in the above-mentioned second patent document, the through hole 44 is formed in the positive terminal side cooling fin 42 that will have potential, and the fastening bolt 70 is penetrated or extended through the through hole 44 and is then coupled to the fastening metal fitting 58, so there has been a further problem that partial discharge might occur under a use environment in which foreign matter is liable to be attached to the positive terminal side cooling fin 42.

Furthermore, because the fastening metal fitting 58 is inserted into the terminal block 50, and a through hole 36 for coupling operation of the fastening bolt 70 is formed in the negative terminal side cooling fin 32, there has been a still further problem that a complicated structure results, too.

SUMMARY OF THE INVENTION

Accordingly, the present invention is intended to obviate the problems as referred to above, and has for its object to provide an alternator which is capable of effectively suppressing the vibration of a circuit board with the use of a simple structure.

Bearing the above object in mind, an alternator according to the present invention includes a casing, a shaft that is rotatably supported by the casing, a rotor fixedly mounted on the shaft, a stator that is composed of a stator core which is fixedly secured to an inner wall surface of the casing, and a stator coil which is wound around the stator core, and a rectifier that is electrically connected to the stator coil for rectifying an alternating current generated in the stator coil into a direct current. The rectifier has a plurality of rectifier elements that forms a full-wave rectifier circuit, a pair of negative and positive terminal side heat sinks that hold the rectifier elements, and a circuit board that electrically connects the rectifier elements and the stator coil to one another. The negative terminal side heat sink, the positive terminal side heat sink and the circuit board are mounted on the casing at a plurality of mounting portions, which are superposed with one another in an axial direction of the shaft, by the use of mounting members. Between adjacent ones of the mounting portions, there are formed abutment portions in which the circuit board is superposed on and placed in abutment with the negative terminal side heat sink or the positive terminal side heat sink, and the abutment portions are fixed to each other by means of a fixing device.

According to the alternator of the present invention, between adjacent ones of the mounting portions, there are formed abutment portions in which the circuit board is superposed on and placed in abutment with the negative terminal side heat sink or the positive terminal side heat sink, and the abutment portions are fixed to each other by means of the fixing device, so there is obtained an advantageous effect that the vibration of the circuit board can be suppressed in a reliable manner.

The above and other objects, features and advantages of the present invention will become more readily apparent to those skilled in the art from the following detailed description of a preferred embodiment of the present invention taken in conjunction with the accompanying drawings.

DETAILED DESCRIPTION OF THE PREFERRED EMBODIMENT

Figure 1:
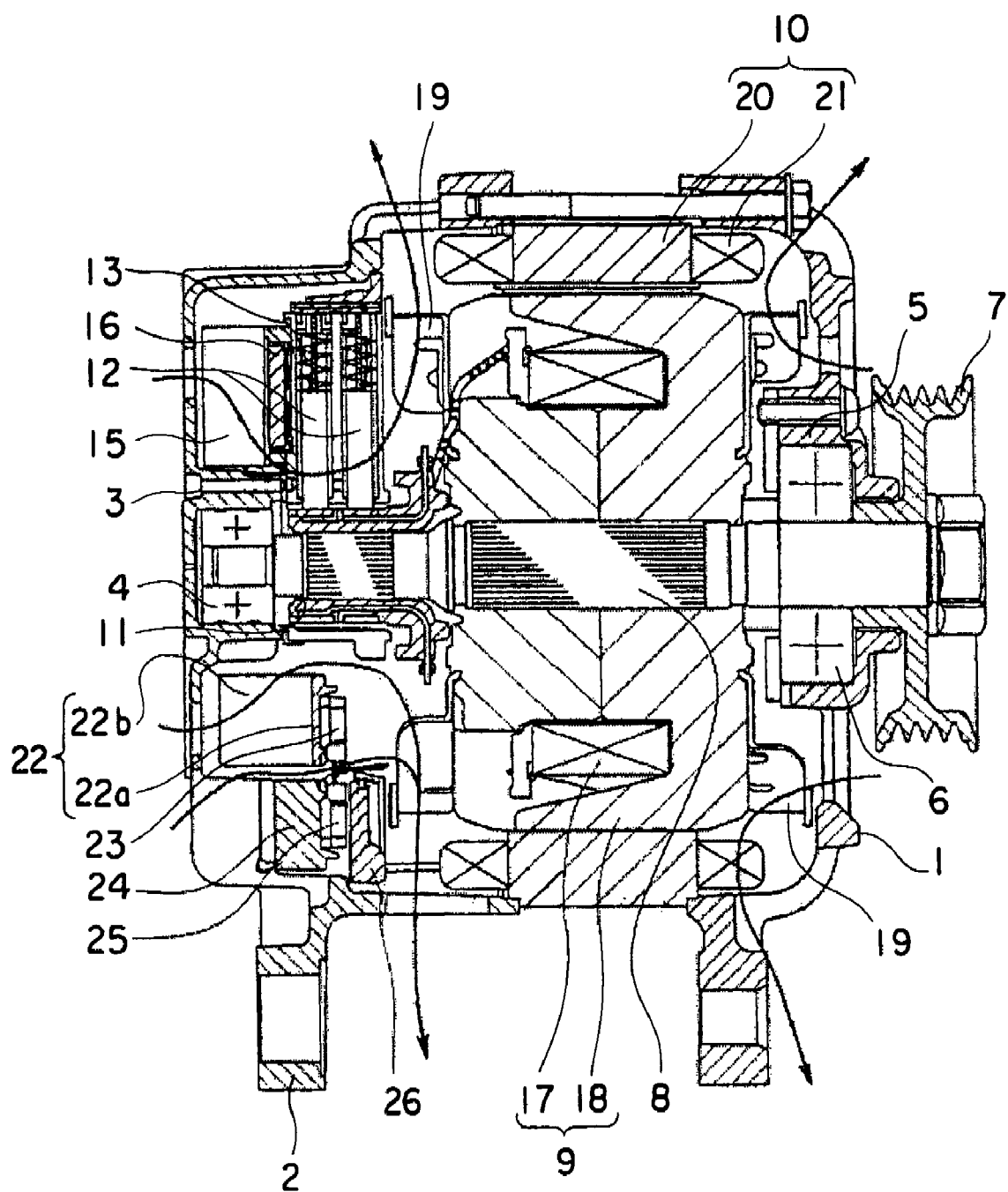
FIG. 1 is a cross sectional view showing an alternator for a vehicle according to an embodiment of the present invention.

Now, a preferred embodiment of the present invention will be described below in detail while referring to the accompanying drawings. Throughout respective figures, the same or corresponding members or parts are identified by the same reference numerals and characters.

Here, note that the reference numerals and characters employed in the following embodiment of the present invention have no relevance to those employed with respect to the aforementioned first and second patent documents described in the background of the invention section, and the following description will be made with individual members and parts of the embodiment of the present invention being denoted by new reference numerals and characters.

Embodiment 1

Figure 2:
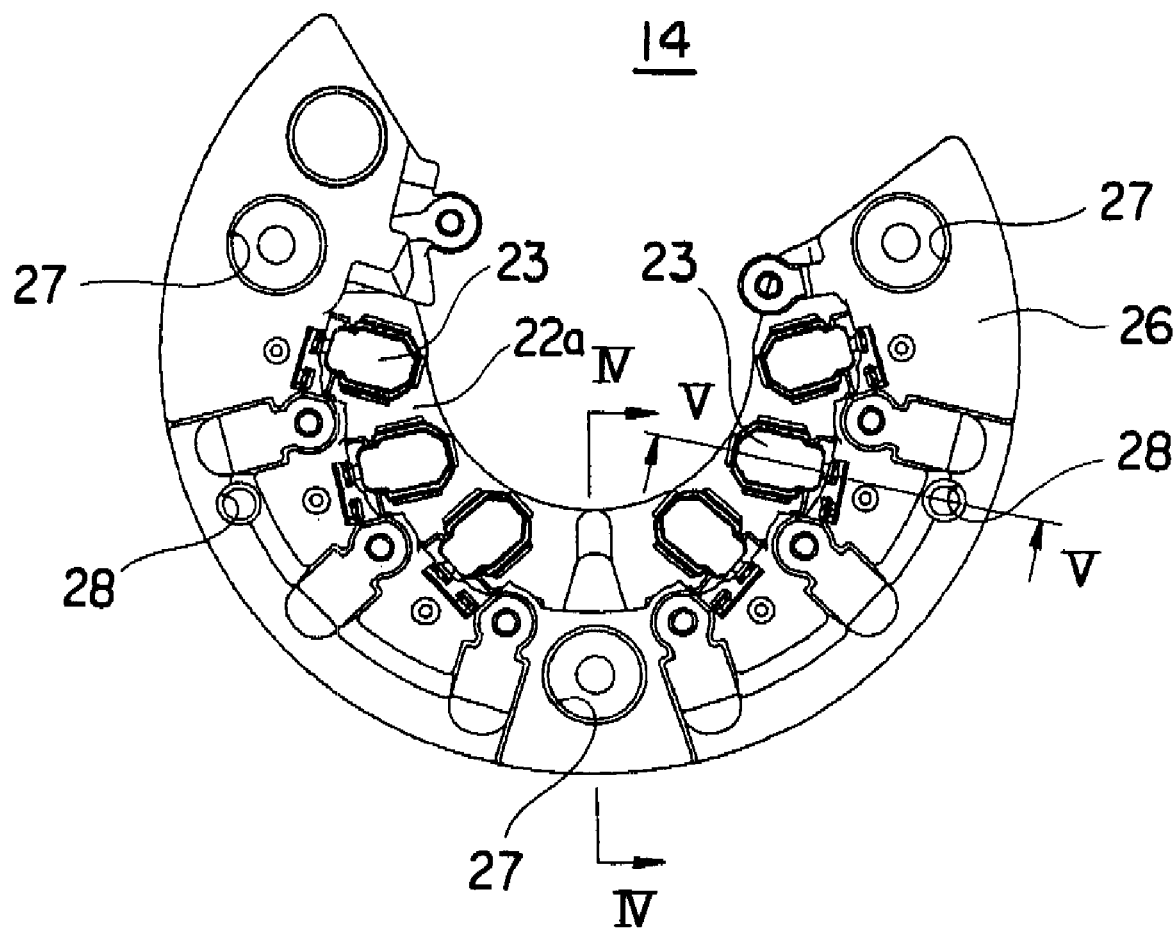
FIG. 2 is a front elevational view showing a rectifier in FIG. 1.
Figure 3:
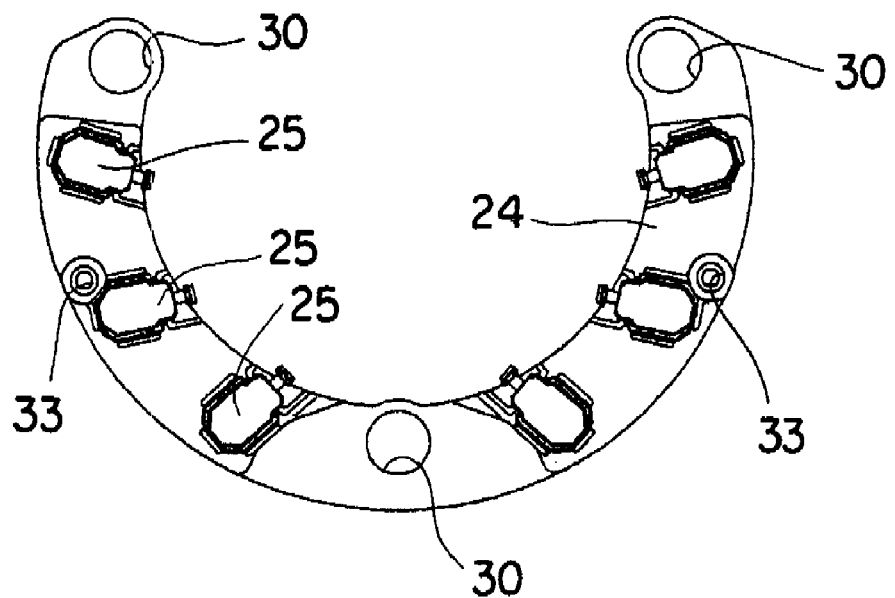
FIG. 3 is a front elevational view showing a negative terminal side heat sink in FIG. 2.
Figure 4:
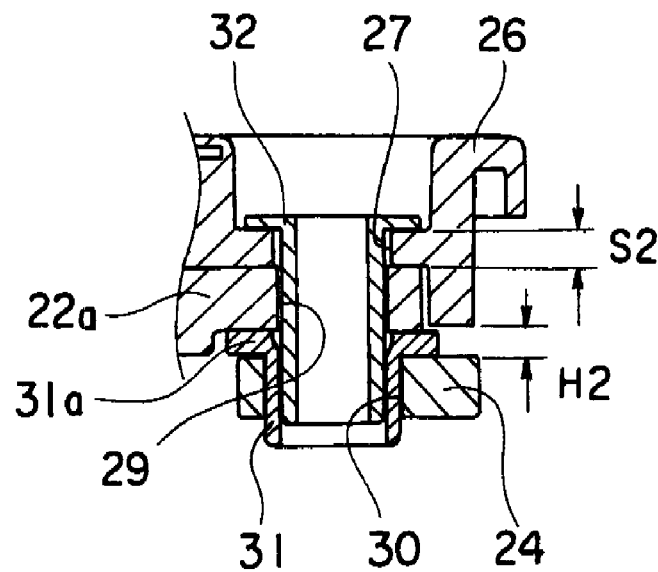
FIG. 4 is a cross sectional arrow view along line IV-IV in mounting portions of FIG. 2.
Figure 5:
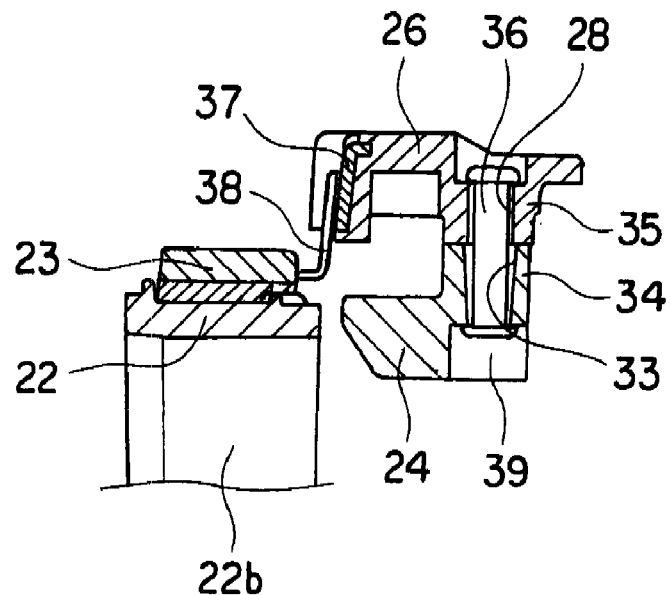
FIG. 5 is a cross sectional arrow view along line V-V in fixed portions of FIG. 2.

Referring to the drawings and first to FIG. 1, there is shown, in a cross sectional view, an alternator for a vehicle according to one embodiment of the present invention. FIG. 2 is a plan view showing a rectifier 14 in FIG. 1, and FIG. 3 is a plan view of a negative terminal side heat sink 24 of FIG. 1. FIG. 4 is a cross sectional arrow view along line IV-IV in FIG. 2, and FIG. 5 is a cross sectional arrow view along line V-V in FIG. 2.

This alternator for a vehicle (hereinafter also referred to as a vehicular alternator) is provided with a casing that is composed of a front bracket 1 and a rear bracket 2 both made of aluminum, and a shaft 8 that is rotatably supported by a front bearing 6 fitted in a bearing receiving portion 5 of the front bracket 1 and by a rear bearing 4 fitted in a bearing receiving portion 3 of the rear bracket 2 and has a pulley 7 fixedly mounted thereon at one end portion thereof.

In addition, the vehicular alternator is further provided with a rundle type rotor 9 that is fixedly mounted on the shaft 8, a stator 10 that is fixedly attached to an inner wall surface of the casing, a slip ring 11 that is fixedly secured to the other end of the shaft 8 for supplying electric current to the rotor 9, a pair of brushes 12 that have their tip end faces in sliding contact with the slip ring 11, a brush holder 13 that serves to receive the brushes 12, a rectifier 14 that is electrically connected to the stator 10 for rectifying an alternating current generated in the stator 10 into a direct current, and a heat sink 15 that is fitted into the brush holder 13, and a voltage regulator 16 that is bonded to the heat sink 15 for controlling and regulating an alternating voltage generated in the stator 10 to be within a predetermined range.

The rotor 9 is composed of a rotor coil 17 that generates a magnetic flux when an electric current flows therethrough, and a field core 18 that is arranged so as to enclose the rotor coil 17 with its magnetic pole being formed by the magnetic flux thus generated in the field core 18. A pair of centrifugal cooling fans 19 are welded to the axially opposite sides of the field core 18.

The stator 10 is composed of a stator core 20, and a stator coil 21 that is formed of a conductor wound around the stator core 20 and serves to generate an alternating current in accordance with a change in the magnetic flux from the rotor coil 17.

The rectifier 14 includes a positive terminal side heat sink 22 that is composed of a heat sink main body 22a of a circular arc band shape, and a plurality of fins 22b arranged upright on a back side of the heat sink main body 22a, a plurality of positive terminal side diodes 23 that serve as rectifier elements formed by resin molding and are fixedly soldered to a surface of the positive terminal side heat sink main body 22a, a negative terminal side heat sink 24 of a circular arc band shape that is grounded by being in surface contact with the rear bracket 2, a plurality of negative terminal side diodes 25 that serve as rectifier elements formed by resin molding and are fixedly soldered to the negative terminal side heat sink 24, and a circuit board 26 in which wiring for electrically connecting between the respective diodes 23, 25 and the stator coil 21 is formed by insert molding, wherein the three-phase alternating current generated in the stator 10 is rectified to a direct current.

The positive terminal side heat sink 22 and the negative terminal side heat sink 24 are arranged substantially in a diametrically planar configuration, and are received in the casing 3. The positive terminal side heat sink 22 and the negative terminal side heat sink 24 are made of aluminum of high thermal conductivity.

The circuit board 26 is to hold terminals of desired shapes by means of an insulating resin, and takes a circular arc band shape, similar to the negative terminal side heat sink 24 and the positive terminal side heat sink 22.

A plurality of circuit board mounting holes 27 are formed in opposite side portions and an intermediate portion of the circuit board 26. Circuit board fastening holes 28 are formed between adjacent ones of the circuit board mounting holes 27.

The circuit board 26, the positive terminal side heat sink 22, and the negative terminal side heat sink 24 are disposed in a side by side relation along the axial direction.

The plurality of positive terminal side diodes 23 are arranged at circumferential intervals on the heat sink main body 22a of the positive terminal side heat sink 22. Positive terminal side mounting holes 29 are formed in the heat sink main body 22a at locations corresponding to the circuit board mounting holes 27, as shown in FIG. 4.

The plurality of negative terminal side diodes 25 are arranged at circumferential intervals on a surface of the negative terminal side heat sink 24 at the side of the circuit board 26. Negative terminal side mounting holes 30 are formed in the negative terminal side heat sink 24 at locations corresponding to the circuit board mounting holes 27.

As shown in FIG. 4, each of first insulating members 31 of a cylindrical shape has a flange 31a interposed between the negative terminal side heat sink 24 and the positive terminal side heat sink 22. A second insulating member 32 of a cylindrical shape having a flange extends through a corresponding circuit board mounting hole 27 in the circuit board 26, a corresponding positive terminal side mounting hole 29 in the positive terminal side heat sink 22, and a corresponding hole in the first insulating member 31. By means of the second insulating members 32, which extend through the circuit board 26, the positive terminal side heat sink 22 and the first insulating members 31, the circuit board 26, the positive terminal side heat sink 22, and the negative terminal side heat sink 24 are integrally assembled or connected with one another.

In addition, the rectifier 14 thus integrally assembled is fixedly secured to the rear bracket 2 by causing the mounting members in the form of screws (not shown) to penetrate or extend through the respective second insulating members 32 to be threaded with the rear bracket 2.

In this embodiment, the circuit board 26, the positive terminal side heat sink 22, and the negative terminal side heat sink 24 are fixedly secured to the rear bracket 2 at three mounting locations or portions superposed in the axial direction of the shaft 8 by means of the mounting members in the form of screws.

As shown in FIG. 5, the negative terminal side heat sink 24 is formed with a plurality of first protruding portions 34 (though only one is illustrated). Each of the first protruding portions 34 has a heat sink fastening hole 33 formed therethrough which corresponds to a corresponding one of the circuit board fastening holes 28. Also, the circuit board 26 is formed with a plurality of second protruding portions 35 (though only one is illustrated), each of which has a tip end face surface placed in abutment with a tip end face of a corresponding first protruding portion 34. Each of the second protruding portions 35 has a circuit board fastening hole 28 arranged in alignment with the heat sink fastening hole 33 in a corresponding first protruding portion 34. A plurality of fastening members in the form of rivets 36, which constitute a fixing device of the present invention, extend or penetrate through the corresponding circuit board fastening holes 28 and the corresponding heat sink fastening holes 33, respectively. Each of the rivets 36 is arranged at a circumferentially central portion of a circular arc line connecting between adjacent ones of the mounting members in the form of screws and at a location near adjacent one of said rectifier elements 25. Each rivet 36 has its tip end portion exposed to a groove 39 formed in the negative terminal side heat sink 24.

The tip end portion of each rivet 36 is crushed in the diametrical direction to engage with a bottom surface of each corresponding groove 39, whereby abutment locations or portions, at which the tip end face of the first protruding portion 34 and the tip end face of the second protruding portions 35 are in abutment with each other, are strongly coupled with each other by means of the rivet 36 thus crushed.

Figure 6:
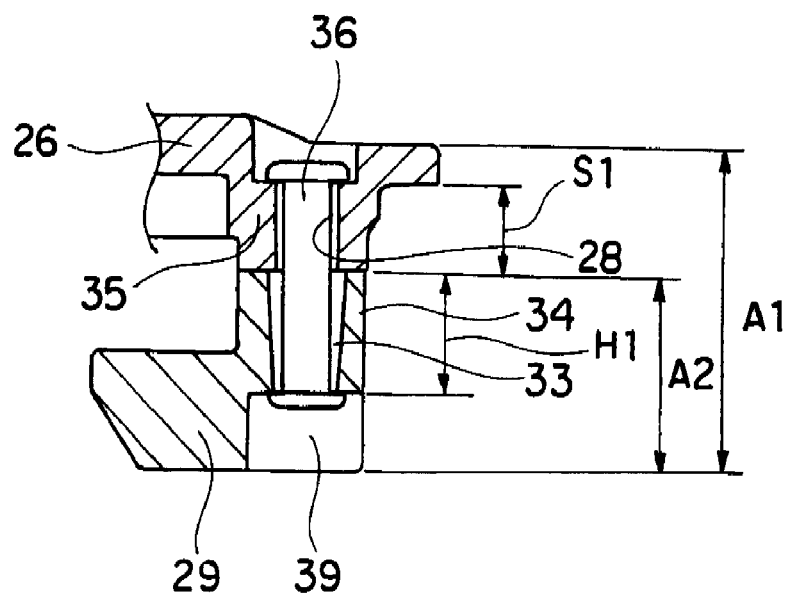
FIG. 6 is an enlarged view of FIG. 5.

FIG. 6 is an enlarged view of essential portions of FIG. 5, wherein each of the heat sink fastening holes 33 has an inner diameter that is larger than an inner diameter of each of the circuit board fastening holes 28. Therefore, even in case where there is a subtle shift or deviation in the position of superposition between the circuit board 26 and the negative terminal side heat sink 24, the tip end portion of a rivet 36, when inserted into a circuit board fastening hole 28 and a heat sink fastening hole 33, is prevented from colliding with a corner or peripheral portion of an inlet opening of the heat sink fastening hole 33, whereby possible damage or breakage of the rivet 36 and a corresponding first protruding portion 34 can be avoided, and at the same time, the efficiency of assembling thereof can be improved.

In addition, the inner diameter of each of the heat sink fastening holes 33 becomes smaller along a direction in which a rivet 36 is inserted, so that an inner wall surface of each heat sink fastening hole 33 forms a taper surface. This taper surface can be formed in an easy manner by making use of a drawing slope when the negative terminal side heat sink 24 is molded by means of die casting.

Moreover, the first protruding portions 34 protrude toward the circuit board 26 from a mounting surface of the negative terminal side heat sink 24 to which the negative terminal side diodes 25 are fixedly attached, so an accordingly increased amount of cooling air generated in accordance with the rotation of the centrifugal fans 19 collides with the first protruding portions 34 and the second protruding portions 35, and hence the first protruding portions 34 and the second protruding portions 35 function as fins for heat dissipation. Furthermore, since the first protruding portions 34 and the second protruding portions 35 are arranged at locations close to the corresponding negative terminal side diodes 25 that are heating elements, so the effect of heat dissipation due to the first protruding portions 34 and the second protruding portions 35 is great.

Further, each of the circuit board fastening holes 28 is formed at an outer diameter side of a circular arc connecting the circuit board mounting holes 27 formed at three locations. Accordingly, an outer diameter side of the circuit board 26, at which the amplitude of vibration thereof is larger than at an inner diameter side thereof, is integrally coupled with the negative terminal side heat sink 24, whereby the vibration resistance of the circuit board 26 can be improved.

In addition, the first protruding portions 34 formed on the negative terminal side heat sink 24 extend along the axial direction of the rivets 36, and the abutment portions of the tip end face of each first protruding portion 34 and the tip end face of each corresponding second protruding portion 35 are arranged close to connecting portions of a terminal 37 exposed from the circuit board 26 and a corresponding terminal 38 led out from a corresponding positive terminal side diode 23. Accordingly, the distance between the abutment portions and the corresponding connecting portions become shorter, so the amplitude of vibration of the connecting portions with respect to the vibration of the circuit board 26 about the abutment portions, which is the origin of vibration, can be suppressed small, thus making it possible to improve the vibration resistance of the connecting portions.

Further, assuming that the height of the second protruding portions 35 of the circuit board 26 is S1 and the height of the negative terminal side heat sink 24 is H1, the value of S1 is substantially equal to the sum of a thickness S2 of the circuit board 26 at the mounting holes 27 and a thickness H2 of the flange 31a of a first insulating member 31.

The circuit board 26 is made, for example, of polyphenylene sulfide (PPS) resin, and the first insulating members 31 are also made of the same resin as the circuit board 26. Even passing through a thermal history, the circuit board 26 and the first insulating members 31 at the mounting portions in the vicinity of the mounting holes 27, 29, 30, and the circuit board 26 at the fixed portions in the vicinity of the fastening holes 28, 33 are substantially equal in the state of change, and hence it is possible to avoid the generation of a distortion in the bridge construction.

Here, note that the circuit board 26 and the first insulating members 31 need not necessarily be made of the same resin material, but may be made of materials having similar physical properties.

Moreover, in the abutment portions in which the tip end face of each first protruding portion 34 and the tip end face of each corresponding second protruding portion 35 are in abutment with each other, it is desirable that the proportion (A2/A1) of the thickness A2 of the negative terminal side heat sink 24, which is a metal member, to the thickness A1 of the rectifier 14, which is from a front surface of the circuit board 26 to a rear surface of the negative terminal side heat sink 24, be equal to or more than ½.

By doing so, the influence of a dimensional change due to a deterioration in the resin material can be decreased as much as possible.

Further, the heat sink fastening holes 33 are formed only in the negative terminal side heat sink 24 to be fixed without providing any hole in the positive terminal side heat sink 22 which is not fixed to the circuit board 26, and the rivets 36 are inserted to penetrate or extend through the circuit board fastening holes 28 of the circuit board 26 and the heat sink fastening holes 33, so that the circuit board 26 and the negative terminal side heat sink 24 are strongly coupled with each other by crushing the tip end portions of the rivets 36 in the diametrical direction.

Furthermore, the circuit board 26 is fixedly secured to the negative terminal side heat sink 24 which is grounded, whereby it is possible to suppress generation of a discharge even under a use environment in which foreign matter is attached to the above-mentioned fixed portions.

In addition, even if the positive terminal side heat sink 22 has been electrolytically corroded, the circuit board 26, being directly fixed to the negative terminal side heat sink 24, does not lose its durability and vibration resistance.

Moreover, the tip end portions of the rivets 36 are crushed while being enlarged or expanded in the diametrical or radial direction without protruding from the groove 39, so there is no need to change or modify the shape of the rear bracket 2 because of the rivets 36.

Here, note that in the above-mentioned embodiment, the rivets 36 are used as fastening members but other types of fastening members such as screws, pins, roll pins, or the like may be employed. Also, blind rivets may be employed.

Further, the rivets 36, being the fastening members, are used as the fixing device that serve to fix the abutment portions to each other in which the tip end faces of the first protruding portions 34 and the tip end faces of the second protruding portions 35 are in abutment with each other, but the tip end faces of the first protruding portions 34 and the tip end faces of the second protruding portions 35 can be fixed to each other by using binding or adhesive members or materials as the fixing device instead of using the fastening members. With the use of such binding or adhesive members or materials, the vibration of the circuit board 26 can be suppressed without increasing the weight thereof.

Furthermore, the second protruding portions 35 of the circuit board 26 can be abolished or may not be formed, and the tip end faces of the first protruding portions 34 of the negative terminal side heat sink 24 can be placed in direct contact with the circuit board 26.

In addition, although in the above-mentioned embodiment, the abutment portions of the circuit board 26 and the negative terminal side heat sink 24 are fixed connected with each other by the use of the rivets 36, the abutment portions of the circuit board 26 and the positive terminal side heat sink 22 can be fixedly connected with each other by using a fixing device such as rivets, binding or adhesive materials, etc.

Moreover, the rear bracket 2 can serve as the negative terminal side heat sink.

Although in the above-mentioned embodiment, reference has been made to the vehicular alternator in which the negative terminal side heat sink 24 is arranged at a location diametrically outside of the positive terminal side heat sink 22, the present invention can be applied even to a vehicular alternator in which a positive terminal side heat sink is arranged at a location diametrically outside of a negative terminal side heat sink.

Further, although in the above-mentioned embodiment, reference has been made to the alternator for vehicular use, the present invention can also be applied to other types of alternators which are driven to rotate by means of a driving source such as an engine, an electric motor, a water mill, etc., in place of an engine for vehicular use.

In addition, as the rectifier elements, there can be used MOS-FETs, IGBTs, or bipolar transistors for example, other than the diodes 23, 25.

While the invention has been described in terms of a preferred embodiment, those skilled in the art will recognize that the invention can be practiced with modifications within the spirit and scope of the appended claims.

What is claimed is:

1. An alternator comprising:
    a casing;
    a shaft that is rotatably supported by said casing;
    a rotor fixedly mounted on said shaft;
    a stator that is composed of a stator core which is fixedly secured to an inner wall surface of said casing, and a stator coil which is wound around said stator core; and
    a rectifier that is electrically connected to said stator coil for rectifying an alternating current generated in said stator coil into a direct current;
    wherein said rectifier has a plurality of rectifier elements that forms a full-wave rectifier circuit, a pair of negative and positive terminal side heat sinks that hold said rectifier elements, and a circuit board that electrically connects said rectifier elements and said stator coil to one another;
    wherein said negative terminal side heat sink, said positive terminal side heat sink and said circuit board are mounted on said casing at a plurality of mounting portions, which are superposed with one another in an axial direction of said shaft, by the use of mounting members; and
    wherein between adjacent ones of said mounting portions, there are formed abutment portions in which said circuit board is superposed on and placed in abutment with said negative terminal side heat sink or said positive terminal side heat sink, and said abutment portions are fixed to each other by means of a fixing device.

2. The alternator as set forth in claim 1, wherein said fixing device is arranged at a location diametrically outside of a circular arc line that connects said mounting members to one another.

3. The alternator as set forth in claim 2 wherein said fixing device is arranged at a circumferentially central portion of a circular arc line connecting between adjacent ones of said mounting members and at a location near adjacent one of said rectifier elements.

4. The alternator as set forth in claim 1, wherein In said abutment portions, said negative terminal side heat sink or said positive terminal side heat sink facing said circuit board has a protruding portion that protrudes toward said circuit board, and said protruding portion has its tip end face placed in abutment with said circuit board.

5. The alternator as set forth in claim 4,
wherein said protruding portion has a heat sink fastening hole formed therethrough in alignment with a circuit board fastening hole formed through said circuit board, and said heat sink fastening hole has an inner diameter at its side near said circuit board larger than an inner diameter of said circuit board fastening hole; and
wherein a fastening member, which constitutes said fixing device, is inserted into said circuit board fastening hole and said heat sink fastening hole.

6. The alternator as set forth in claim 5, wherein said negative terminal side heat sink or said positive terminal side heat sink, in which said heat sink fastening hole is formed, has a groove formed therein in communication with said heat sink fastening hole at a side thereof opposite to said circuit board, and said fastening member has a tip end portion engaged with a bottom surface of said groove.

7. The alternator as set forth in claim 6, wherein said fastening member is inserted into said circuit board fastening hole and said heat sink fastening hole formed in said negative terminal side heat sink.

8. The alternator as set forth in claim 1, wherein said casing is composed of a first bracket and a second bracket, and said first bracket serves as said negative terminal side heat sink.

* * * * *